United States Patent Office 3,134,169
Patented May 26, 1964

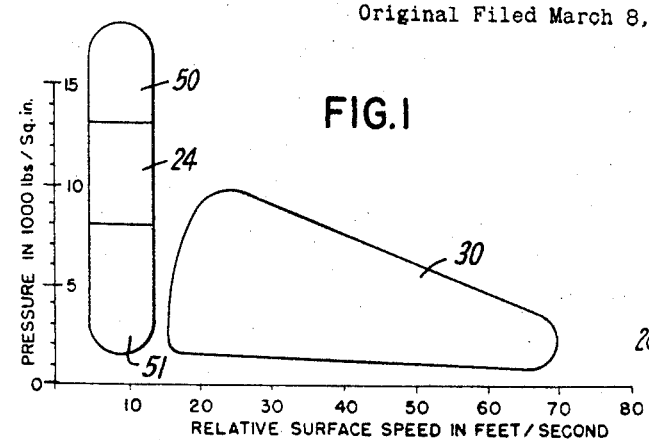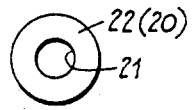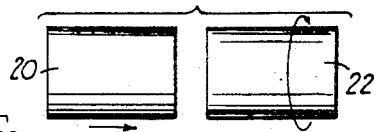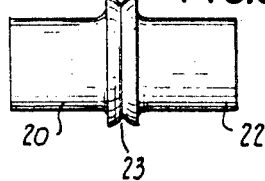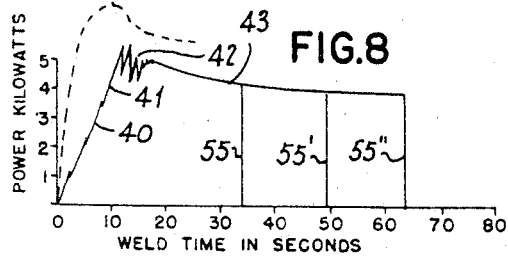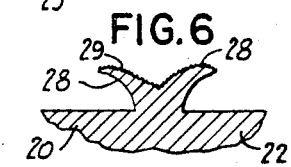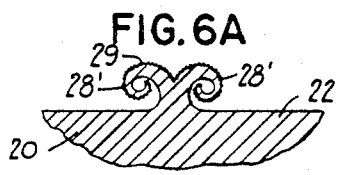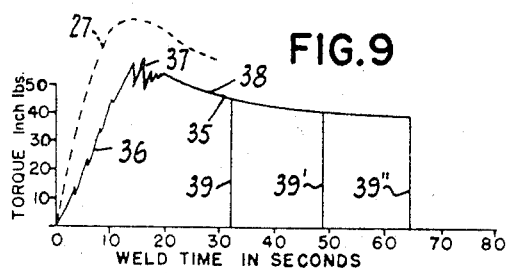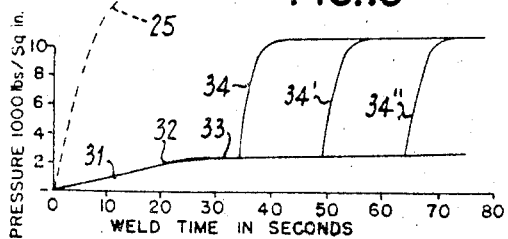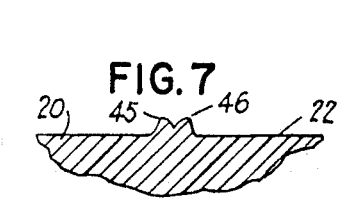
INVENTORS
MILTON BERNARD HOLLANDER
MICHAEL FRANCIS CAMPS-CAMPINS

3,134,169
FRICTION WELDING
Milton Bernard Hollander, Stamford, and Michael Francis Camps-Campins, Norwalk, Conn., assignors to American Machine & Foundry Company, a corporation of New Jersey
Continuation of application Ser. No. 94,311, Mar. 8, 1961. This application Apr. 24, 1963, Ser. No. 275,311
5 Claims. (Cl. 29—470.3)

This invention relates in general to welding processes, and, more particularly, to friction or spin welding.

This application is a continuation of our copending application Serial No. 94,311, filed March 8, 1961, and now abandonded.

An object of this invention is to provide a stronger friction weld.

Another object of this invention is to accomplish a superior friction weld which produces a smaller upset which is easier to clear away and conserves weld material.

Still another object of this invention is to provide a weld, which, by its nature of formation and final characteristics, can serve to join and seal thin walled sections which cannot be accomplished by a conventional friction welding cycle.

A further object of this invention is to accomplish a superior friction weld using a heretofore unknown range of welding pressures and relative surface speeds.

Additional objects, advantages and features of invention reside in the particular steps of this process of welding and their application as will be described in the specification and accompanying drawing in which:

FIG. 1 is a graph of pressures and relative surface speeds showing the areas within which friction welding according to this invention may be best accomplished.

FIG. 2 is an end view of a workpiece to be friction welded;

FIG. 3 is a side view of two workpieces about to be friction welded;

FIG. 4 is a side view of the two workpieces being rotated relative to each other and brought together at the start of a friction welding cycle;

FIG. 5 is a side view of the two workpieces after the completion of the friction welding cycle of this invention;

FIGS. 6 and 6A are longitudinal sections through fragments of two friction welded workpieces showing the weld area and the upset as it generally appears when workpieces are conventionally friction welded;

FIG. 7 is a longitudinal section through a fragment of two friction welded workpieces showing the weld area and the upset as it appears when the workpieces are friction welded according to this invention;

FIG. 8 is a graph of the power requirement plotted against welding time in seconds for a conventional friction welding cycle and for the process of this invention;

FIG. 9 is a graph of the required torque plotted against welding time for a conventional friction welding cycle and for this invention; and FIG. 10 is a graph of the pressure which is applied to two workpieces plotted against the weld time in seconds for a conventional friction welding cycle and for this invention.

Referring to the drawing in detail, FIG. 2 shows an end view of a workpiece 20 which contains a longitudinal channel 21. In one group of samples which were tested, the outside diameter of the workpiece 20 was 1¼ inches while the inside diameter of the channel 21 was ⅞ inch.

As shown in FIG. 3, a workpiece 20 and an identical workpiece 22 are to be friction welded. At least one of the workpieces is rapidly rotated relative to the other. As shown in FIG. 4, one of the workpieces is advanced towards the other during this relative rotation. Frictional heat is evolved until, at a desired moment, the relative rotation is rapidly stopped and the pieces 20 and 22 are forced together forming the upset 23. This is the basic manner in which all friction welding is accomplished.

If the two workpieces 20 and 22 were of a steel such as 1045 or 4140 steel, the conventional and heretofore only known range of pressures and relative surface speeds within which friction welding could substantially be accomplished is indicated generally on FIG. 1 within the area indicated by the numeral 24. The numeral 50 indicates the area within which alloy steels and tool steels are conventionally friction welded while the numeral 51 indicates the area within which bronzes, aluminums and coppers are conventionally friction welded. These areas 24, 50 and 51, within which conventional friction welding is accomplished, use relatively high pressures to force the workpieces together during the period of their relative rotation. At the same time, the relative surface speed in the area of contact between the workpieces is comparatively low. From an evaluation of many samples welded with conventional friction welding techniques, it may be inferred that these techniques give rise to a pressure forging or a solid phase welding in that it is mainly the large pressure applied during rotation which causes the material to become plastic and flow.

Referring now to FIGS. 8 through 10, if two workpieces 20 and 22 of steel are friction welded using conventional techniques and the workpieces are of the dimensions stated, the dotted line 25 in FIG. 10 indicates the manner in which pressure is applied during a conventional welding cycle. The entire conventional welding cycle occupies a comparatively short period of time usually of the order of about 5 to 20 seconds. While a relatively high pressure is applied during the relative rotation of the workpieces, a considerably higher upset pressure may be applied after the relative rotation ceases. This high pressure, which is applied after rotation stops, is indicated on FIG. 10. As shown in FIG. 8, the power requirement during a conventional weld cycle is indicated by the dotted line 26. This power requirement falls off only slightly from its peak value during the weld cycle. In a like manner, the torque between the workpieces remains relatively high during the entire conventional welding cycle as indicated by the dotted line 27 in FIG. 9.

When using the welding technique of a conventional friction welding cycle to accomplish even an adequate weld of steel workpieces, certain upset pressures must be maintained. When such a weld is accomplished as shown in FIGS. 6 and 6A, the upset 28 and 28' from a conventional welding cycle has a particular characteristic appearance. It curves upwards and outwards from the weld area and has the characteristic circumferential serrations 29 formed on both its inward facing outer surfaces. The surface 29 resemblies the outer surface of a "Type 2" chip from metal cutting. In metal cutting, such a surface is formed by shearing.

Referring again to FIG. 1, the general range of pressures and relative surface speeds embraced by this invention are indicated generally by the area designated by numeral 30. As may be seen, the surface speeds are considerably greater than those used in conventional friction welding techniques and the pressures involved during frictional heating are considerably lower.

Referring again to FIGS. 8, 9 and 10, the welding cycle of this invention often takes a longer time than the conventional welding cycle and, for the workpieces 20 and 22, may be upwards of 45 seconds.

As shown in FIG. 10, the pressure is gradually increased during the period of relative rotation of the workpieces up to a given point whereon it is held constant. As indicated in FIG. 10, the solid line 31 shows the typical pressures applied to the workpieces plotted against the weld time in seconds. The segment 32 of line 31 indicates the gradual increase of pressure during the first phase of the relative rotation of the workpieces. The segment 33 of line 31 indicates the period of constant pressure during the welding cycle. This portion may vary considerably depending on the size of the objects being welded and the materials involved. Segment 34 of line 31 starts at the completion of the relative rotation of the workpieces and indicates the comparatively higher upset pressures applied to the workpieces after their relative rotation is stopped. In the practice of this invention, these upset pressures are rarely as high as those required in a conventional friction welding cycle. Segment 34 of line 31 indicates the time of application of the upset pressure when welding 1020 steel. 34' and 34" indicate the later time of applying the upset pressure to 1045 and 4140 steels.

Referring now to FIG. 9, the torque applied during the weld cycle of this invention for steels is plotted against the welding time in seconds and indicated by the solid line 35. As indicated by the segment 36 of line 35, the torque between the workpieces increases to a peak during the first fifteen seconds or so of this welding cycle. At this point, as indicated by segment 37 of line 35, the torque between the pieces fluctuates rapidly. As indicated by the segment 38 of line 35, the torque between the workpieces continues to drop off and approaches a constant value during the remainder of the welding cycle until the relative rotation between the workpieces is rapidly stopped as indicated by the segment 39 of line 35. The time at which the relative rotation of the workpieces is stopped depends on the steel or material being welded. Line 39 indicates the general stopping time for 1020 steel, 39' indicates the general stopping time for 1045 steel and 39" indicates a stopping time for 4140 steel.

As shown in FIG. 8, the power requirement for this welding cycle is plotted against the weld time in seconds and indicated by a line 40. As indicated by the segment 41 of the line 40, the power requirement reaches a peak at about the same time as the torque between the workpieces reaches a peak as indicated by the erratic segment 42 of the line 40. As indicated by the segment 43 of the line 40, the power requirement gradually falls off approaching a constant value during the remainder of the welding cycle of this invention until the relative rotation of the workpieces is rapidly stopped. The power requirement is basically identical to the torque requirement except for frictional losses in the welding apparatus. The lines 55, 55' and 55" indicate stopping times for different steels.

The friction welding cycle of this invention gives rise to an entirely new phenomena in that the higher surface speeds and the lower pressures enable the metal of the workpieces 20 and 22 in the weld area to become fluid. This thin layer of fluid within the weld area may act as a hydrodynamic bearing during the latter portion of this welding cycle.

As shown in FIGS. 8, 9 and 10, the torque starts to fall off from the peak of the segment 36 of the line 35 as the hydrodynamic bearing erratically forms and intermittent seizure takes place as indicated by the erratic section 37. During the time indicated by the segment 38 of the line 35, molten metal exists between the workpieces 20 and 22. During this period after the formation of the molten film of metal, it may be seen that the power requirement falls off after the segment 42 of the line 40 as indicated by the segment 43 of the line 40. The erratic sections 37 and 42 in FIGS. 8 and 9 may be explained by the theory that the molten film of metal alternatively is formed and then fails so that there are intermittent seizures within the weld area until sufficient heat is generated to provide a continuous molten film whereon the torque smoothly falls off as indicated by the segment 38 of the line 35 and the segment 43 of the line 40.

As shown in FIG. 10, after the relative rotation of the workpieces 20 and 22 is stopped, an upset pressure, indicated by the segments 34, 34' and 34" of the line 31, is applied. This causes molten and plastic metal to flow and form the upset 45 as shown in FIG. 7. This upset 45 is characterized in that it is considerably smaller than the upset 28 of the conventional friction welding process. Furthermore, the upset 45 is characterized in that it has smooth outer facing surfaces 46 which do not have the relatively large circumferential serrations 29 of the conventional upsets 28 and 28'.

Referring again to FIG. 1, the average relative surface speeds within the weld area 30 which are within the contemplation of this invention for the friction welding of steels vary from about 15 feet per second to 70 feet per second. In order to weld at all, the pressures during rotation must be at least 1000 pounds per square inch for steel. However, should these pressures increase much over 10,000 pounds per square inch, the metal film formed during the heating cycle breaks down and localized seizure takes place resulting in accompanying chatter and non-uniformity of the weld. Thus the upper limits of the pressures which may be used within the contemplation of this invention are those which tend to break down the thin molten film with too great a load capacity.

As is further shown in FIG. 1, the area 30, within which the welding cycle of this invention may be carried out for steels, is considerably removed from the area 24 within which a conventional welding cycle for steels is carried out. Between these two areas there is an area in which friction welding may not be carried out without excessive power or torque requirements, overly large upset, seizure between the workpieces, and resulting uneven and irregular friction welds.

The expression "average relative surface speed" as employed herein and in the appended claims describes the velocity at a point on the face of the workpiece which is moving at an average velocity relative to the inside and outside radius, and is defined by the equation:

$$V = \frac{N}{1080}[(O.D.^3 - I.D.^3)/(O.D.^2 - I.D.^2)]$$

$V$ = average relative surface speed, feet per second
$N$ = the angular speed of one piece sliding relative to the other, revolutions per minute
$O.D.$ = outside diameter, in.
$I.D.$ = inside diameter, in.

Essentially, the equation averages the velocity across the profile of the workpiece. If the workpiece is a solid bar, the average relative surface speed is the velocity at ⅔ the radius of the bar.

What is claimed is:

1. The process of friction welding steel workpieces comprising the steps of establishing a relative rotation between workpieces with an average relative surface speed between 15 and 70 feet per second, forcing said workpieces together with a pressure from 1000 to 10,000 pounds per square inch in the area of contact between the workpieces, rapidly stopping the relative rotation of the workpieces, and thereafter applying a higher pressure forcing the workpieces together and molten metal from the area of contact.

2. The process according to claim 1 in which the higher pressure in the weld area is maintained until the meal cools and hardens.

3. The process according to claim 1 in which the period of relative rotation of the workpieces lasts more than 30 seconds.

4. The process according to claim 1 in which both the entire step of rapidly stopping the relative rotation of the workpieces and the starting of the step of applying a higher pressure forcing the workpieces together take place in less than 2 seconds.

5. The process of friction welding steel workpieces comprising the steps of rotating workpieces relative to each other with an average relative surface speed between 15 and 70 feet per second, forcing the relatively rotating workpieces together with a pressure from 1000 to 10,000 pounds per square inch in the area of contact between the relatively rotating workpieces until a film of molten metal forms in the area of contact between the relatively rotating workpieces, rapidly stopping the relative rotation of the workpieces, and continuing forcing the workpieces together to upset metal from the area of contact between said workpieces.

References Cited in the file of this patent

UNITED STATES PATENTS

| | | |
|---|---|---|
| 1,624,501 | Nelson | Apr. 12, 1927 |
| 2,354,267 | Lytle et al. | July 25, 1944 |
| 2,657,660 | Crowe | Nov. 3, 1953 |
| 2,956,611 | Jendrisak et al. | Oct. 18, 1960 |

FOREIGN PATENTS

| | | |
|---|---|---|
| 752,789 | Great Britain | Oct. 24, 1945 |